United States Patent
Tatsukawa

(10) Patent No.: US 6,634,778 B2
(45) Date of Patent: Oct. 21, 2003

(54) VEHICULAR HEADLAMP FOR CONTROLLING LIGHT DISTRIBUTION OF VEHICULAR HEADLAMP HAVING IMPROVED SYNTHESIZED LIGHT DISTRIBUTION PATTERN

(75) Inventor: Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/141,869

(22) Filed: May 10, 2002

(65) Prior Publication Data
US 2002/0167817 A1 Nov. 14, 2002

(30) Foreign Application Priority Data
May 14, 2001 (JP) ........................................ 2001-142659

(51) Int. Cl.$^7$ .................................................. B60Q 1/04
(52) U.S. Cl. ...................... 362/523; 362/517; 362/464; 362/512; 362/529; 362/233; 362/297; 362/350
(58) Field of Search ................................ 362/523, 517, 362/464, 512, 529, 233, 297, 350, 269, 346, 238, 239, 250, 430, 531, 532, 543, 544, 37, 39, 40, 41, 43, 465, 466

(56) References Cited
U.S. PATENT DOCUMENTS

| 1,328,992 | A | * | 1/1920 | Harley ........................ 362/530 |
| 4,663,696 | A | | 5/1987 | Miyazawa et al. |
| 4,827,388 | A | | 5/1989 | Miyazawa |
| 4,831,506 | A | | 5/1989 | Miyazawa |
| 4,903,173 | A | * | 2/1990 | Mochizuki et al. ......... 362/544 |
| 4,943,893 | A | | 7/1990 | Shibata et al. |
| 6,332,699 | B1 | * | 12/2001 | Lee ............................. 362/466 |

* cited by examiner

Primary Examiner—Sandra O'Shea
Assistant Examiner—Mark Tsidulko
(74) Attorney, Agent, or Firm—Sughrue Mion, PLLC

(57) ABSTRACT

A vehicular headlamp capable of moving an auxiliary light distribution pattern in the horizontal direction by pivoting an auxiliary lamp fixture unit in which degradation in the visibility of the road surface ahead of the vehicle caused by movement of an auxiliary light distribution pattern is substantially reduced. The brightness of a low-beam light distribution pattern formed by a headlamp unit is partially reinforced with auxiliary light distribution patterns formed by a pair of auxiliary lamp fixture units. When the vehicle turns, one of the auxiliary light distribution patterns is moved in the same direction with an upward displacement, whereby sufficient visibility ahead of the vehicle is assured. As a result of this movement, the hot zone of the auxiliary light distribution pattern is separated from the hot zone of the low-beam light distribution pattern. Since the hot zone is moved on the road surface at a distance from the vehicle, the illumination intensity of the hot zone on the road surface ahead of the vehicle is reduced. Accordingly, the road surface ahead of the vehicle will not become relatively dark in a region between the hot zones of the basic and auxiliary light distribution patterns due to contrast with the hot zones.

8 Claims, 7 Drawing Sheets

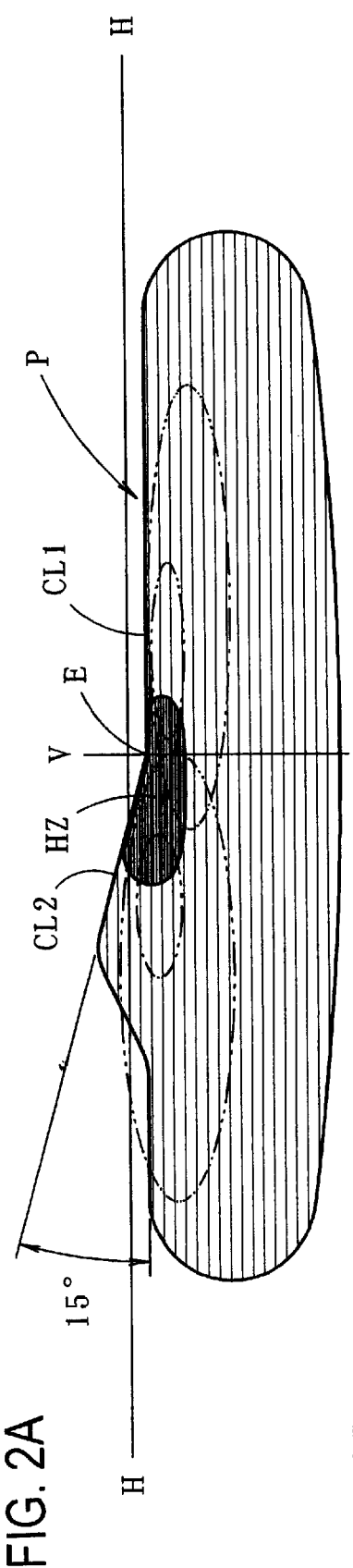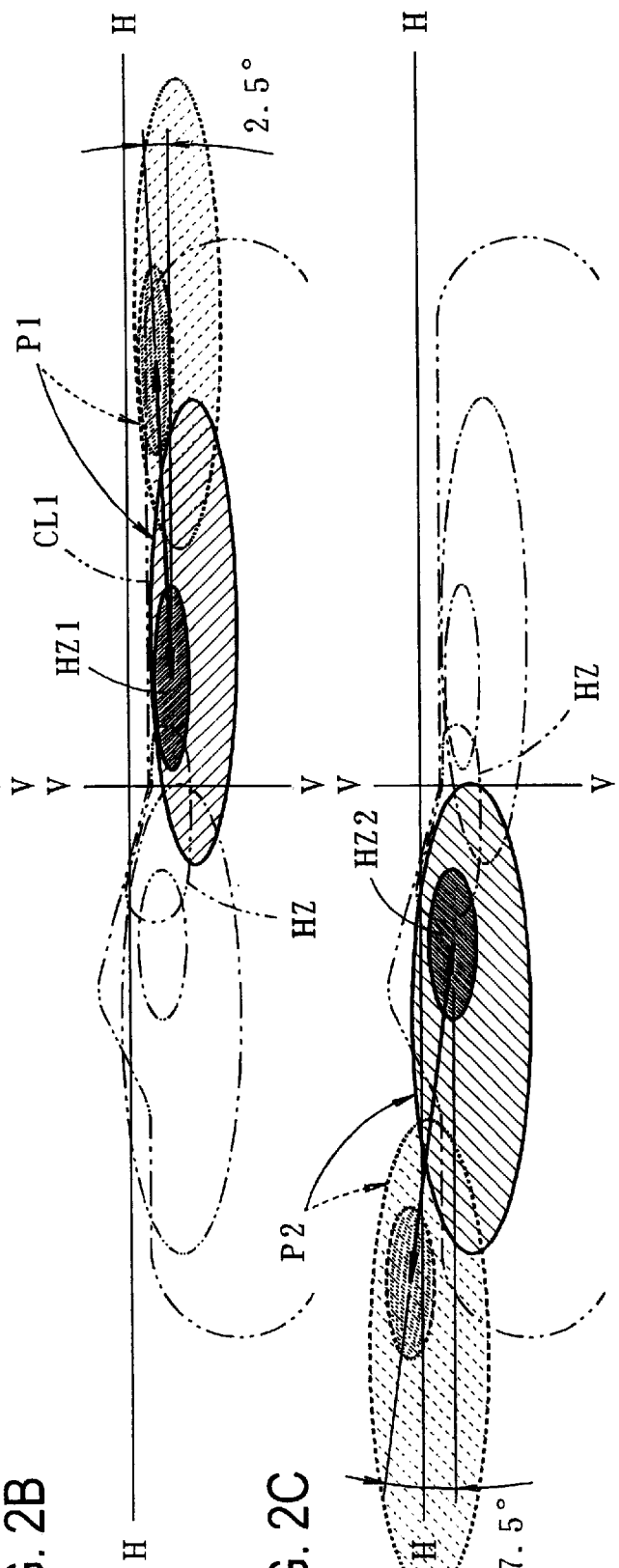
FIG. 2A
FIG. 2B
FIG. 2C

VEHICULAR HEADLAMP FOR CONTROLLING LIGHT DISTRIBUTION OF VEHICULAR HEADLAMP HAVING IMPROVED SYNTHESIZED LIGHT DISTRIBUTION PATTERN

BACKGROUND OF THE INVENTION

The present invention relates to a multi-lamp type vehicular headlamp.

A vehicular headlamp is commonly capable of selectively switching between a low-beam light distribution pattern and a high-beam light distribution pattern. It is difficult for a vehicular headlamp having fixed light distribution patterns to produce a beam with a light distribution pattern which is always optimal for the instant operating conditions of the vehicle.

In view of this problem, a vehicular headlamp has been proposed which forms a synthesized light distribution pattern of beams emitted from a plurality of lamp fixture units and wherein at least one of the lamp fixture units is pivoted as appropriate according to the operating conditions of the vehicle (e.g., steering angle and speed) so that a beam can be produced with a synthesized light distribution pattern which varies according to the operating conditions of the vehicle.

FIG. 6 is a front view of a vehicular headlamp 110, which is a specific example of such a vehicular headlamp, and FIG. 7 is a perspective view of a synthesized light distribution pattern that is emitted ahead of the vehicle from the vehicular headlamp 110 while the vehicle is turning left.

As shown in these two drawings, the vehicular headlamp 110 has a headlamp unit 116 for emitting a low beam with a basic light distribution pattern P' having a horizontal cutoff line CL1' and an oblique cutoff line CL2', and a pair of auxiliary lamp fixture units 118, 120 for emitting beams with respective auxiliary light distribution patterns P1', P2' that partially reinforce the brightness of the basic light distribution pattern P'. By pivoting the auxiliary lamp fixture units 118, 120 about respective vertical axes A1', A2' to move the auxiliary light distribution patterns P1', P2' as appropriate in the horizontal direction, the vehicular headlamp 110 will provide a beam with a synthesized light distribution pattern which varies according to the operating conditions of the vehicle.

However, this vehicular headlamp 110 has certain problems. For example, as shown in FIG. 7, when the auxiliary light distribution pattern P2' formed under the oblique cutoff line CL2' moves away from the center of the basic light distribution pattern P' to form a pattern P2", the hot zone HZ' of the basic light distribution pattern P' and the hot zone HZ2' of the auxiliary light distribution pattern P2" become separated from each other. As a result, the road surface ahead of the vehicle becomes relatively dark in the region between the hot zones HZ', HZ2' due to contrast with the hot zones HZ', HZ2', thereby significantly degrading the visibility of that region of the road surface.

SUMMARY OF THE INVENTION

The present invention is made in view of the above problem, and it is an object of the present invention to provide a vehicular headlamp capable of moving an auxiliary light distribution pattern in the horizontal direction by pivoting an auxiliary lamp fixture unit and which is capable of effectively suppressing degradation in the visibility of the road surface ahead of the vehicle caused by movement of the auxiliary light distribution pattern.

The present invention achieves the above object by appropriate selection of the pivot direction of the auxiliary lamp fixture unit.

More specifically, a vehicular headlamp according to the present invention includes: a headlamp unit for emitting a beam with a prescribed basic light distribution pattern, and an auxiliary lamp fixture unit for emitting a beam with an auxiliary light distribution pattern that partially reinforces the brightness of the basic light distribution pattern, the auxiliary lamp fixture unit being supported so that it is pivotable about a prescribed pivot axis to move the auxiliary light distribution pattern in a horizontal direction. The above vehicular headlamp is characterized in that the pivot axis is tilted at a prescribed angle with respect to a vertical direction so that the auxiliary light distribution pattern is displaced upward when it is moved away from the center of the basic light distribution pattern.

The headlamp unit and auxiliary lamp fixture unit are not particularly limited in terms of their specific structures. For example, a parabolic lamp fixture unit or a projector-type lamp fixture unit may be employed. Moreover, the light sources of the headlamp unit and auxiliary lamp fixture unit are not particularly limited in terms of their specific structures. For example, a discharge light-emitting portion of a discharge bulb or a filament of an incandescent bulb such as halogen bulb may be employed.

According to the above structure, in the vehicular headlamp of the present invention, the auxiliary lamp fixture unit is supported so that it is pivotable about a prescribed pivot axis to move in the horizontal direction the auxiliary light distribution pattern that is formed by a beam emitted from the auxiliary lamp fixture unit. Moreover, the pivot axis is tilted at a prescribed angle with respect to the vertical direction so that the auxiliary light distribution pattern is displaced upward when moved away from the center of the basic light distribution pattern that is formed by a beam emitted from the headlamp unit. As a result, the following effects can be obtained:

As the auxiliary light distribution pattern is moved away from the center of the basic light distribution pattern, the hot zone of the auxiliary light distribution pattern may be separated away from the hot zone of the basic light distribution pattern. However, since the hot zone of the auxiliary light distribution pattern is displaced upward at this time, the position of this hot zone on the road surface ahead of the vehicle is shifted away from the vehicle. As a result, the illumination intensity of this hot zone on the road surface ahead of the vehicle is reduced sharply. Since the two hot zones do not concurrently reside on both sides of the road surface ahead of the vehicle, the road surface ahead of the vehicle is prevented from becoming relatively dark in the region between the hot zones due to contrast with the hot zones.

Thus, according to the present invention, a vehicular headlamp is realized which is capable of moving the auxiliary light distribution pattern in a horizontal and upward direction by pivoting the auxiliary lamp fixture unit and which therefore effectively significantly reduces any degradation in visibility of the road surface ahead of the vehicle caused by movement of the auxiliary light distribution pattern.

The auxiliary light distribution pattern is moved away from the center of the basic light distribution pattern mainly in order to improve the visibility ahead of the vehicle when the vehicle turns right or left. Displacing the auxiliary distribution pattern upward as in the present invention enables the road surface away from the vehicle to be illuminated, thus causing the visibility of the road surface ahead of the vehicle to be effectively improved.

The basic light distribution pattern is not particularly limited in terms of its specific composition. When the basic light distribution pattern is a low-beam light distribution pattern having a horizontal cutoff line and an oblique cutoff line, a hot zone is formed in a region relatively close to the vehicle on the road surface ahead of the vehicle. It is therefore particularly effective to use the structure of the present invention which is capable of preventing the road surface ahead of the vehicle from becoming relatively dark in the region between the hot zones. In this case, when the auxiliary lamp fixture unit forms the auxiliary light distribution pattern under the oblique cutoff line, the tilt angle of the pivot axis of the auxiliary lamp fixture unit with respect to the vertical direction may be smaller than the angle at which the oblique cutoff line is tilted upward. As a result, the following effects can be obtained:

In the low-beam light distribution pattern having a horizontal cutoff line and an oblique cutoff line, the horizontal cutoff line is formed by horizontally diffused, deflected light from the headlamp unit, and the oblique cutoff line is formed by obliquely diffused, deflected light along the oblique cutoff line from the headlamp unit. Therefore, the region located under the oblique cutoff line and above the horizontal cutoff line and somewhat away from the center of the basic light distribution pattern becomes relatively dark.

The tilt angle of the pivot axis with respect to the vertical direction may be smaller than the angle at which the oblique cutoff line is tilted upward. In this case, the brightness of the relatively dark region (the region located under the oblique cutoff line and above the horizontal cutoff line and offset from the center of the basic light distribution pattern) can be effectively compensated when the auxiliary light distribution pattern is moved away from the center of the basic light distribution pattern. This further improves the visibility ahead of the vehicle when the vehicle turns right or left.

The above-described vehicular headlamp may include as the auxiliary lamp fixture unit a unit corresponding to the horizontal cutoff line for forming the auxiliary light distribution pattern under the horizontal cutoff line and a unit corresponding to the oblique cutoff line for forming the auxiliary light distribution pattern under the oblique cutoff line. This improves the visibility ahead of the vehicle whether the vehicle turns right or left. In such a case, it is desirable in order to prevent glare to the driver of an oncoming vehicle to tilt the pivot axis of the unit corresponding to the horizontal cutoff line at a smaller angle than that of a pivot axis of the unit corresponding to the oblique cutoff line with respect to the vertical direction. More specifically, by setting the tilt angle of the pivot axis of the unit corresponding to the horizontal cutoff line to a relatively small value, the auxiliary light distribution pattern formed by the unit corresponding to the horizontal cutoff line can be prevented from extending excessively upward beyond the horizontal cutoff line when it is moved away from the center of the basic light distribution pattern. This improves the visibility ahead of the vehicle when the vehicle turns right or left, while preventing glare to the driver of an oncoming vehicle.

BRIEF DESCRIPTION OF THE DRAWINGS

FIG. 2A shows a light distribution pattern formed by a headlamp unit of the vehicular headlamp of FIG. 1.

FIG. 2B shows a light distribution pattern a left auxiliary lamp fixture unit of the vehicular headlamp of FIG. 1.

FIG. 2C shows a light distribution pattern formed by a right auxiliary lamp fixture unit of the vehicular headlamp of FIG. 1.

DESCRIPTION OF THE PREFERRED EMBODIMENTS

Hereinafter, preferred embodiments of the present invention will be described in conjunction with the accompanying drawings.

Figure 1:
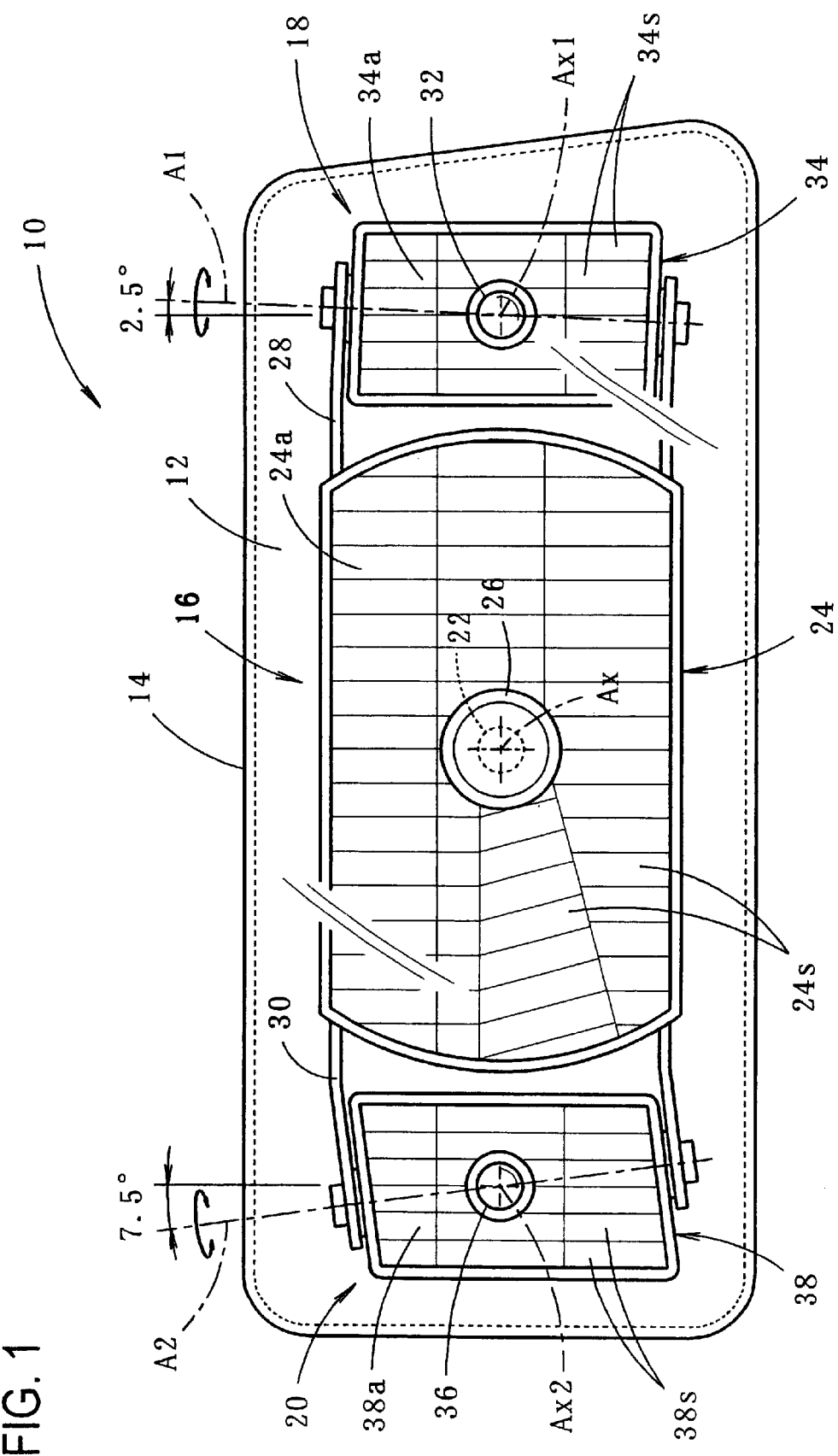
FIG. 1 is a front view of a vehicular headlamp constructed according to a preferred embodiment of the present invention.

FIG. 1 is a front view of a vehicular headlamp 10 constructed according to a preferred embodiment of the present invention.

As shown in this drawing, the vehicular headlamp 10 has a headlamp unit 16 and a pair of left and right auxiliary lamp fixture units 18, 20, all of which are housed in a lamp chamber defined by a plain light-transmitting cover 12 and a lamp body 14.

The headlamp unit 16 has a light-source bulb (H4 halogen bulb) 22, a reflector 24 and a shade 26, and is supported on the lamp body 14 by an aiming mechanism (not shown) in such a manner that the headlamp unit 16 can be tilted in the vertical and horizontal directions.

The reflector 24 has a reflecting surface 24a having a plurality of reflecting elements 24s arranged on a surface defined by a paraboloid of revolution about an optical axis Ax. The reflecting surface 24a reflects the light from a light source (low-beam filament or high-beam filament) of the light-source bulb 22 in the forward direction in a diffusing and deflecting manner, so that a beam is emitted ahead of the vehicle with a prescribed light distribution pattern. When the low-beam filament is turned ON, a low-beam light distribution pattern P (basic light distribution pattern) is formed as shown in FIG. 2A.

The low-beam light distribution pattern P is a low-beam light distribution pattern for left light distribution, and has a horizontal cutoff line CL1 on the right of line V—V (i.e., on the side of the opposing lane) and an oblique cutoff line CL2 on the left thereof (i.e., on the side of the lane of the vehicle) (line V—V is a vertical line passing through the central axis of the lamp fixture). The oblique cutoff line CL2 extends upward at an angle of 15° with respect to the horizontal cutoff line CL1. The horizontal cutoff line CL1 extends slightly downward (at about 0.5 to 0.6°) with respect to line H—H (i.e., a horizontal line passing through the central axis of the lamp fixture). The low-beam light distribution pattern P has a hot zone (high luminous intensity region) HZ extending around the intersection (elbow point E) of the horizontal cutoff line CL1 and the oblique cutoff line CL2. The hot zone HZ extends somewhat more to the left than to the right.

As shown in FIG. 1 the auxiliary lamp fixture units 18, 20 are pivotally supported on the reflector 24 of the headlamp unit 16 by respective pairs of tipper and lower brackets 28, 30.

The pivot axis A1 of the auxiliary lamp fixture unit 18 (the unit corresponding to the horizontal cutoff line) located on the left of the headlamp unit 16 (on the right in FIG. 1) is tilted in the lower right direction (toward the headlamp unit 16) at an angle of 2.5° from the vertical direction. On the other hand, the pivot axis A2 of the auxiliary lamp fixture unit 20 (the unit corresponding to the oblique cutoff line) located on the right of the headlamp unit 16 (on the left in FIG. 1) is tilted in the lower left direction (toward the headlamp unit 16) at an angle of 7.5° from the vertical direction.

The auxiliary lamp fixture units 18, 20 are each pivoted to a prescribed pivot angle position by a pivot control device (not shown) through a driving mechanism (not shown) according to the operating conditions of the vehicle such as steering angle and vehicle speed, in a manner which is known in the art.

The auxiliary lamp fixture unit 18 includes a light-source bulb (single-filament-type H7 halogen bulb) 32 and a reflector 34. The reflector 34 has a reflecting surface 34a having a plurality of reflecting elements 34s arranged on a paraboloid of revolution about an optical axis Ax1. The reflecting surface defined by the reflecting elements 34a reflects the light from the light-source bulb 32 in the forward direction in a diffusing and deflecting manner, so that a beam is emitted ahead of the vehicle with an auxiliary light distribution pattern P1 as shown in FIG. 2B.

The auxiliary light distribution pattern P1 has a flat shape that is elongated sideways, and has a hot zone HZ1 near its upper left edge. As the auxiliary lamp fixture unit 18 is pivoted about the pivot axis A1, the auxiliary light distribution pattern P1 is moved in the horizontal direction at a tilt angle of 2.5° with respect to the line H—H. As a result, the auxiliary light distribution pattern P1 can be located at any position between a first position near the line V—V under the horizontal cutoff line CL1 (the position shown by a solid line in FIG. 2B) and a second position offset from the line V—V to the right with an upward displacement (the position shown by dashed line in FIG. 2B). When the auxiliary light distribution pattern P1 is located at the first position, its hot zone HZ1 partially overlaps the hot zone HZ of the low-beam light distribution pattern P.

The auxiliary lamp fixture unit 20 includes a light-source bulb (single-filament-type H7 halogen bulb) 36 and a reflector 38. The reflector 38 has a reflecting surface 38a having a plurality of reflecting elements 38s arranged on a paraboloid of revolution about an optical axis Ax2. The reflecting surface 38a reflects the light from the light-source bulb 36 in the forward direction in a diffusing and deflecting manner, so that a beam is emitted ahead of the vehicle with an auxiliary light distribution pattern P2 as shown in FIG. 2C.

The auxiliary light distribution pattern P2 has a somewhat flat shape that is elongated sideways, and has a hot zone HZ2 near its upper right edge. As the auxiliary lamp fixture unit 20 is pivoted about the pivot axis A2, the auxiliary light distribution pattern P2 is moved in the horizontal direction at a tilt angle of 7.5° with respect to the line H—H. As a result, the auxiliary light distribution pattern P2 can be located at any position between a first position near the line V—V under the oblique cutoff line CL2 (the position shown by a solid line in FIG. 2C) and a second position offset from the line V—V to the left with an upward displacement (the position shown by a dashed line in FIG. 2C). When the auxiliary light distribution pattern P2 is located at the first position, its hot zone HZ2 partially overlaps the hot zone HZ of the low-beam light distribution pattern P.

Figure 3:
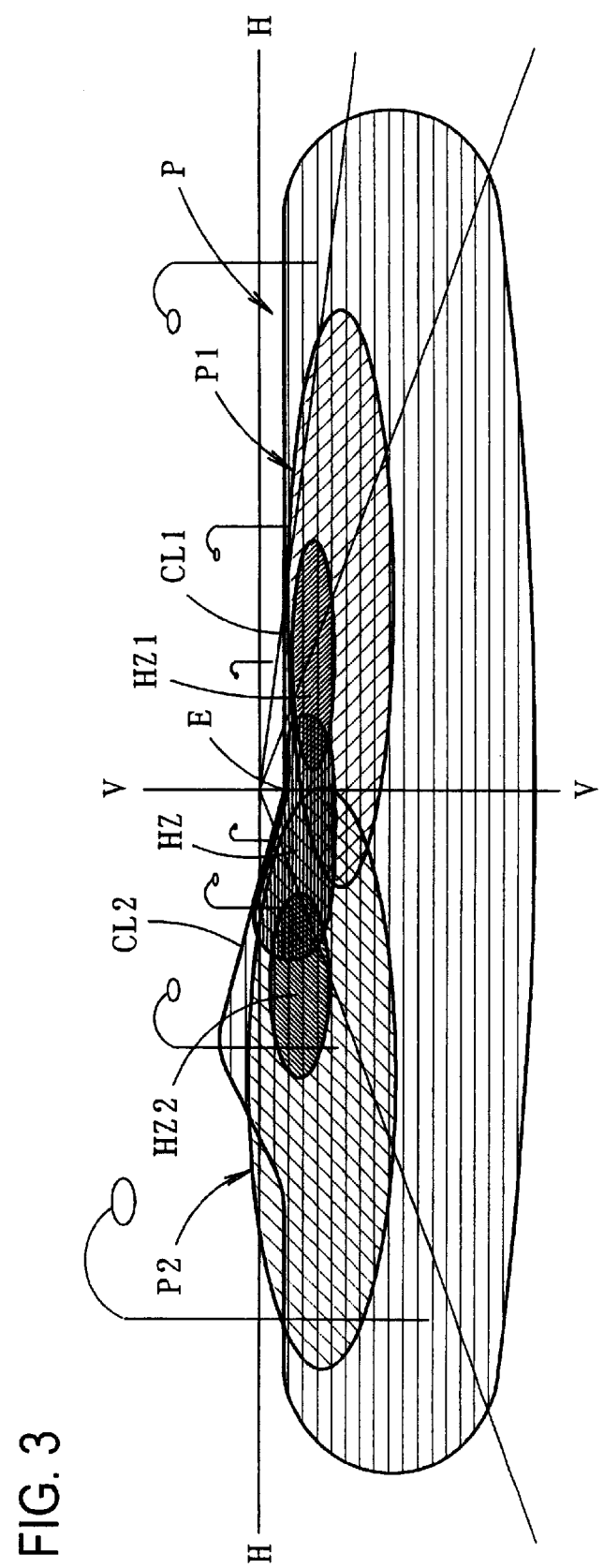
FIG. 3 is a perspective view of a synthesized light distribution pattern formed on a virtual vertical screen located 25 meters ahead of a lamp fixture by a low beam emitted from the vehicular headlamp of FIG. 1 when the vehicle is moving straight ahead.
Figure 4:
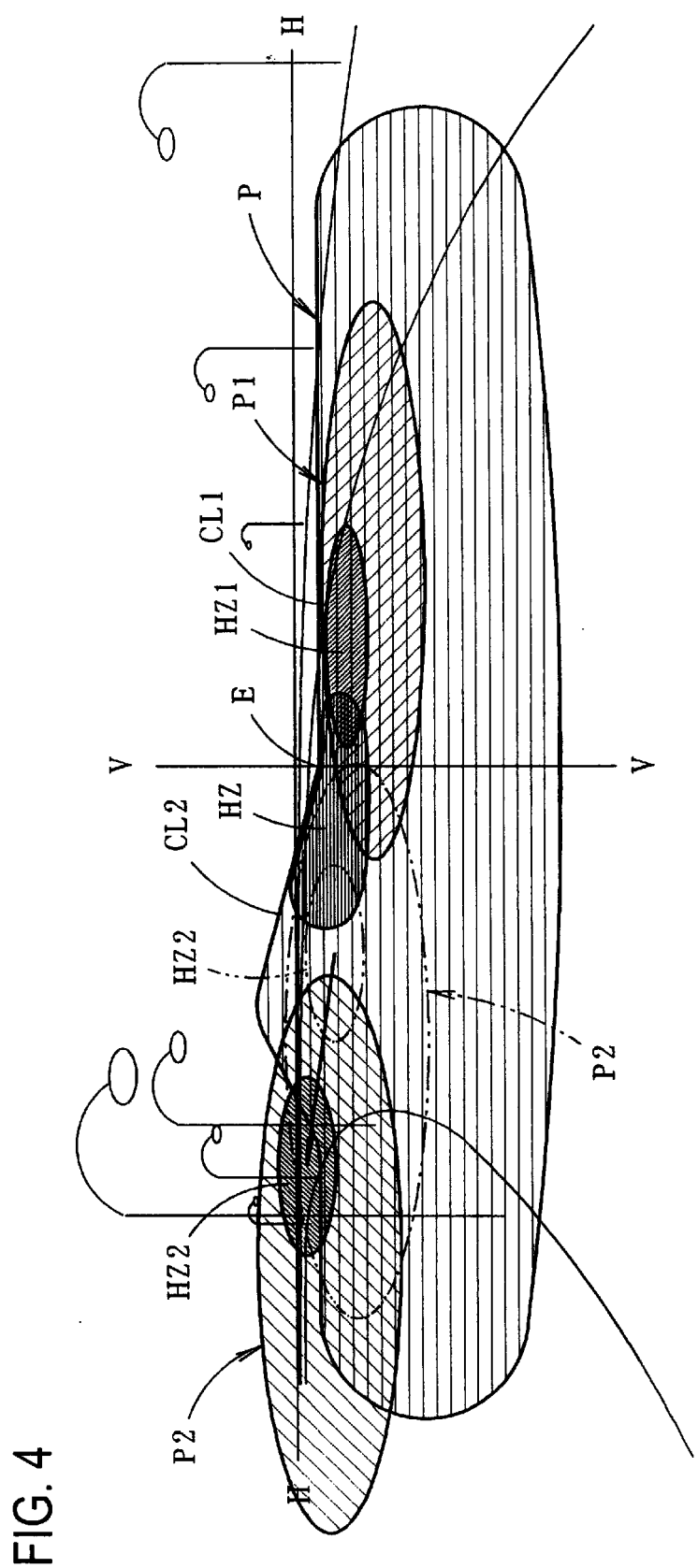
FIG. 4 is a perspective view of a synthesized light distribution pattern formed on the virtual vertical screen by the low beam emitted when the vehicle turns left.
Figure 5:
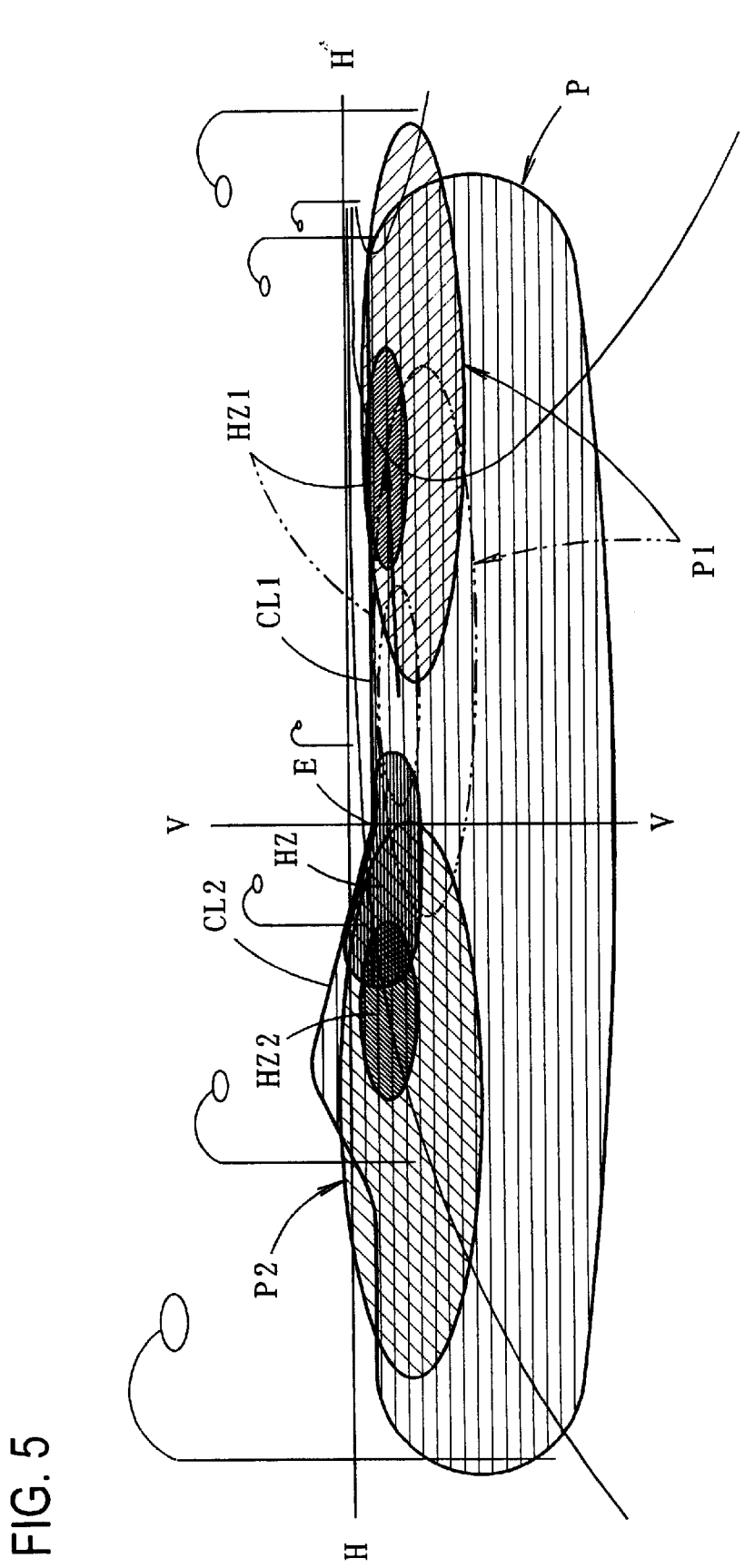
FIG. 5 is a perspective view of a synthesized light distribution pattern that is formed on the virtual vertical screen by the low beam emitted when the vehicle turns right.
Figure 6:
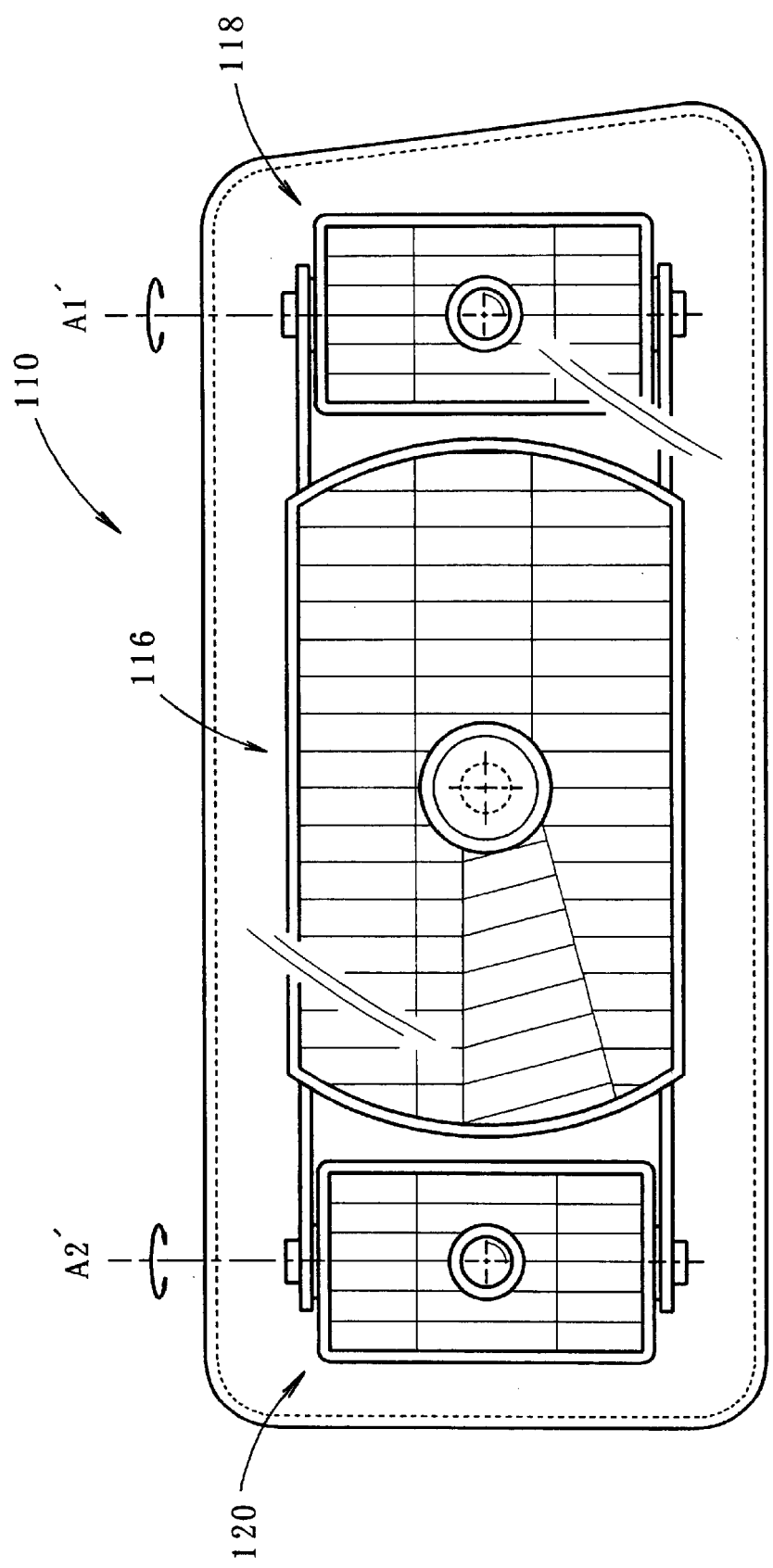
FIG. 6 corresponds to FIG. 1, showing a conventional example.
Figure 7:
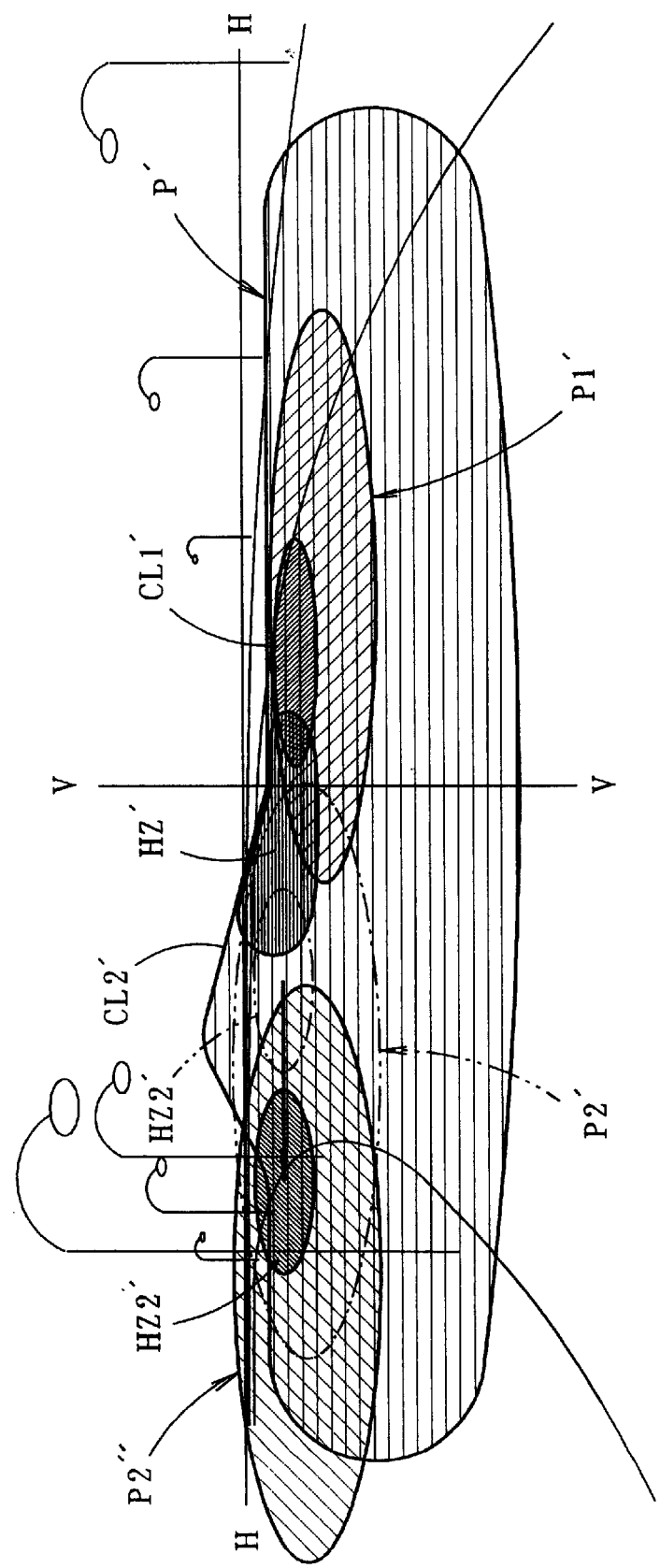
FIG. 7 corresponds to FIG. 4, illustrating the effects of the conventional example.

FIGS. 3, 4 and 5 are perspective views of a synthesized light distribution pattern formed on a virtual vertical screen located 25 meters ahead of the lamp fixture by a low beam emitted from the vehicular headlamp 10 of the present embodiment (that is, a synthesized light distribution pattern of the low-beam light distribution pattern P and the two auxiliary light distribution patterns P1, P2). FIG. 3 shows an example where the vehicle is moving straight ahead, FIG. 4 shows an example where the vehicle is turning left, and FIG. 6 shows an example where the vehicle is turning right.

As shown in FIG. 3, when the vehicle is moving straight ahead, both auxiliary light distribution patterns P1, P2 are located at their respective first positions. In this case, the respective hot zones HZ1, HZ2 of the auxiliary light distribution patterns P1, P2 are located on both sides of the hot zone HZ of the low-beam light distribution pattern P, continuous therewith. Since a single wide hot zone is formed on the road surface ahead of the vehicle, sufficient visibility of the road surface ahead of the vehicle is assured.

As shown in FIG. 4, when the vehicle turns left, the auxiliary light distribution pattern P1 is located at the first position, whereas the auxiliary light distribution pattern P2 is moved in the obliquely upward left direction toward the second position. As a result, the road surface at a distance from the vehicle is illuminated, whereby sufficient visibility ahead of the vehicle is assured when the vehicle turns left. In this case, the hot zone HZ2 of the auxiliary light distribution pattern P2 is separated from the hot zone HZ of the low-beam light distribution pattern P. Since the hot zone HZ2 of the auxiliary light distribution pattern P2 is moved to the road surface at a distance from the vehicle, illumination intensity of the hot zone HZ2 on the road surface ahead of the vehicle is reduced sharply. Accordingly, the road surface ahead of the vehicle does not become relatively dark in a region between the hot zone HZ of the low-beam light distribution pattern P and the hot zone HZ2 of the auxiliary light distribution pattern P2 due to contrast with the hot zones HZ, HZ2.

As shown in FIG. 5, when the vehicle turns right, the auxiliary light distribution pattern P2 is located at the first position, whereas the auxiliary light distribution pattern P1 is moved in the upward right direction toward the second position. As a result, the road surface at a distance from the vehicle is illuminated, whereby sufficient visibility ahead of the vehicle is assured when the vehicle turns right. In this case, the hot zone HZ1 of the auxiliary light distribution pattern P1 is separated from the hot zone HZ of the low-beam light distribution pattern P. Since the hot zone HZ1 of the auxiliary light distribution pattern P1 is moved to the road surface at a distance from the vehicle, the illumination intensity of the hot zone HZ1 on the road surface ahead of the vehicle is reduced sharply. Accordingly, the road surface ahead of the vehicle does not become relatively dark in a region between the hot zone HZ of the low-beam light distribution pattern P and the hot zone HZ1 of the auxiliary light distribution pattern P1 due to contrast with the hot zones HZ, HZ1.

As has been specifically described above, in the vehicular headlamp 10 of the present embodiment, the auxiliary lamp fixture units 18, 20 are pivotally supported about the respective pivot axes A1, A2 so that the auxiliary light distribution patterns P1, P2 formed by beams emitted from the pair of left and right auxiliary lamp fixture units 18, 20 can be moved in the horizontal direction. The pivot axes A1, A2 are respectively tilted at an angle of 2.5° and 7.5° with respect to the vertical direction so that the auxiliary light distribution patterns P1, P2 are displaced upward as they are moved away from the line V—V (i.e., away from the center of the low-beam light distribution pattern P). As a result, the following effects can be obtained:

As the auxiliary light distribution pattern P1, P2 is moved away from line V—V, the hot zones HZ1, HZ2 may be separated from the hot zone HZ of the low-beam light distribution pattern P. However, since the hot zones HZ1, HZ2 are displaced upward with the movement of the auxiliary light distribution pattern P1, P2, the position of the hot zones HZ1, HZ2 on the road surface is shifted away from the vehicle. As a result, the illumination intensity of the hot zones HZ1, HZ2 on the road surface ahead of the vehicle is reduced sharply. Since the hot zones HZ and HZ1 or the hot zones HZ and HZ2 do not concurrently reside on both sides of the road surface ahead of the vehicle, the road surface ahead of the vehicle can be prevented from becoming relatively dark in the region between the hot zones HZ, HZ1 or the hot zones HZ, HZ2 due to contrast with the hot zones HZ, HZ1 or the hot zones HZ, HZ2.

Thus, adoption of the present invention effectively suppresses degradation in visibility of the road surface ahead of the vehicle caused by the movement of the auxiliary light distribution patterns P1, P2.

Moreover, in the present embodiment, the auxiliary light distribution patterns P1, P2 are displaced upward as they are moved away from the line V—V. This enables the road surface away from the vehicle to be sufficiently illuminated, thus effectively improving the visibility of the road surface ahead of the vehicle.

In the above-described embodiment, the auxiliary lamp fixture unit 20 forms the auxiliary light distribution pattern P2 under the oblique cutoff line CL2 of the low-beam light distribution pattern P. However, the pivot axis A2 of the auxiliary lamp fixture unit 20 is tilted at an angle of 7.5° with respect to the vertical direction, which is somewhat smaller (half) than the angle (15°) at which the oblique cutoff line CL2 is tilted upward. Thus, it is possible to effectively compensate for the brightness of a region around line H—H that is located somewhat away from line V—V to the left, that is, a region in the low-beam light distribution pattern P that becomes relatively dark when the auxiliary light distribution pattern P2 is moved to the left. As a result, the visibility ahead of the vehicle can be significantly improved when the vehicle turns left.

The auxiliary lamp fixture unit 18 forms the auxiliary light distribution pattern P1 under the horizontal cutoff line CL1 of the low-beam light distribution pattern P. However, the pivot axis Al of the auxiliary lamp fixture unit 18 is tilted at a relatively small angle (2.5°) with respect to the vertical direction. Accordingly, the auxiliary light distribution pattern P1 does not extend excessively upward beyond the horizontal cutoff line CL1 when it is moved to the right. This improves the visibility ahead of the vehicle when the vehicle turns right, while preventing glare to the driver of an oncoming vehicle.

The pivot axes A1, A2 may be tilted at an angle other than 2.5° and 7.5° as appropriate.

In the present embodiment, the oblique cutoff line CL2 is tilted upward at an angle of 15°. However, it may be tilted at another angle as appropriate. The oblique cutoff line CL2 may be replaced with a cutoff line extending in the horizontal direction at a level higher than the horizontal cutoff line CL1.

In the present embodiment, the auxiliary lamp fixture units 18, 20 are supported on the reflector 24 of the headlamp unit 16. Therefore, even if the aiming of the headlamp unit 16 is adjusted, the relative positional relation between the low-beam light distribution pattern P and the auxiliary light distribution patterns P1, P2 can be maintained. It should be noted that the auxiliary lamp fixture units 18, 20 may alternatively be supported on the lamp body 14 independently of the headlamp unit 16.

In accordance with the above-described embodiment, the auxiliary lamp fixture units 18, 20 are arranged on both sides of the headlamp unit 16. However, the same effects as those of the present embodiment can be obtained with other arrangements of the auxiliary lamp fixture units 18, 20. Moreover, it is possible to provide only one of the auxiliary lamp fixture units 18, 20. In such a case as well, the same effects as those obtained by providing two auxiliary lamp fixture units can be obtained.

In the above-described embodiment, light-distribution control for the headlamp unit 16 and the auxiliary lamp fixture units 18, 20 is performed by the reflectors 24, 34, and 38. Alternatively, the light-transmitting cover 12 may be formed with lens elements so as to provide the required light-distribution control function.

What is claimed is:

1. A vehicular headlamp, comprising: a headlamp unit for emitting a beam having a predetermined basic light distribution pattern, and an auxiliary lamp fixture unit for emitting a beam with an auxiliary light distribution pattern that partially reinforces the brightness of said basic light distribution pattern, said auxiliary lamp fixture unit being supported so that it is pivotable about a predetermined pivot axis, said pivot axis being tilted at a predetermined angle with respect to a vertical direction so that, when the vehicle makes a turn from a straight ahead direction to the left or right, said auxiliary light distribution pattern is displaced upward when moved away from a center of said basic light distribution pattern.

2. The vehicular headlamp according to claim 1, wherein said basic light distribution pattern is a low-beam light distribution pattern having a horizontal cutoff line and an oblique cutoff line, said auxiliary lamp fixture unit forms said auxiliary light distribution pattern under said oblique cutoff line, and said tilt angle of said pivot axis with respect to said vertical direction is smaller than an angle at which said oblique cutoff line is tilted upward.

3. A vehicular headlamp, comprising: a headlamp unit for emitting a beam having a predetermined basic light distribution pattern, and first and second auxiliary lamp fixture units for emitting respective beams with auxiliary light distribution patterns that partially reinforce the brightness of said basic light distribution pattern, said first and second auxiliary lamp fixture units being supported so as to be pivotable about respective predetermined pivot axes, said pivot axes being tilted at respective predetermined tilt angles with respect to a vertical direction so that said auxiliary light distribution patterns are displaced upward when moved away from a center of said basic light distribution pattern and said tilt angle of said first pivot axis with respect to said vertical direction being smaller than said tilt angle of said second pivot axis.

4. The vehicular headlamp of claim 3, wherein said tilt angle of said first pivot axis with respect to said vertical direction is approximately one-half said tilt angle of said second pivot axis.

5. A vehicular headlamp, comprising: a headlamp unit for emitting a beam having a predetermined basic light distribution pattern having a horizontal cutoff line and an oblique cutoff line, a first auxiliary lamp fixture unit for forming an auxiliary light distribution pattern under said horizontal cutoff line, and a second auxiliary lamp fixture unit for forming an auxiliary light distribution pattern under said oblique cutoff line, said first and second auxiliary lamp fixture units being supported so as to be pivotable about respective predetermined pivot axes, said pivot axes being tilted at respective predetermined tilt angles with respect to a vertical direction so that said auxiliary light distribution patterns are displaced upward when moved away from a center of said basic light distribution pattern, said pivot axis of said first auxiliary lamp unit being tilted at a smaller angle than said pivot axis of said second auxiliary lamp unit.

6. The vehicular headlamp of claim 5, wherein said tilt angle of said first pivot axis with respect to said vertical direction is approximately one-half said tilt angle of said second pivot axis.

7. The vehicular headlamp according to claim 3, wherein said first and second auxiliary lamp fixture units are disposed such that, when the first auxiliary lamp fixture unit pivots, the second auxiliary lamp fixture unit is stationary, and vice versa.

8. A vehicular headlamp, comprising: a headlamp unit for emitting a beam having a predetermined basic light distribution pattern, and an auxiliary lamp fixture unit for emitting a beam with an auxiliary light distribution pattern that partially reinforces the brightness of said basic light distribution pattern, said auxiliary lamp fixture unit being supported so that it is pivotable about a predetermined pivot axis, said pivot axis being tilted at a predetermined angle with respect to a vertical direction so that said auxiliary light distribution pattern is displaced upward when moved away from a center of said basic light distribution pattern, wherein said basic light distribution pattern is a low-beam light distribution pattern having a horizontal cutoff line and an oblique cutoff line, said auxiliary lamp fixture unit forms said auxiliary light distribution pattern under said oblique cutoff line, and said tilt angle of said pivot axis with respect to said vertical direction is smaller than an angle at which said oblique cutoff line is tilted upward.

* * * * *